United States Patent

Schabert et al.

[11] 3,928,133
[45] Dec. 23, 1975

[54] BIOLOGICAL SHIELD FOR A NUCLEAR REACTOR

[75] Inventors: Hans-Peter Schabert, Erlangen; Johann Ropers, Grossdechsendorf; Erich Strickroth, Erlangen, all of Germany

[73] Assignee: Siemens Aktiengesellschaft, Munich, Germany

[22] Filed: Apr. 24, 1973

[21] Appl. No.: 354,000

[30] Foreign Application Priority Data
May 26, 1972  Germany.............................. 2220486

[52] U.S. Cl. ................................................. 176/87
[51] Int. Cl............................................. G21c 11/08
[58] Field of Search................... 176/87, DIG. 2, 38

[56] References Cited
UNITED STATES PATENTS

| | | | |
|---|---|---|---|
| 3,022,238 | 2/1962 | Kolflat | 176/87 |
| 3,115,450 | 12/1963 | Schanz | 176/87 |
| 3,192,121 | 6/1965 | Challender et al. | 176/87 |
| 3,205,145 | 9/1965 | Margen | 176/DIG. 2 |
| 3,712,851 | 1/1973 | Isberg et al. | 176/87 |
| 3,713,968 | 1/1973 | Kennedy et al. | 176/87 |

*Primary Examiner*—Benjamin A. Borchelt
*Assistant Examiner*—C. T. Jordan
*Attorney, Agent, or Firm*—Kenyon & Kenyon Reilly Carr & Chapin

[57] ABSTRACT

The invention discloses a biological shield for a nuclear reactor such as a pressurized-water reactor and the like. The biological shield surrounds the reactor pressure vessel and is made of concrete. The shield includes two concentric shield parts and a cooling medium is conducted through a gap conjointly defined by the shield parts.

25 Claims, 3 Drawing Figures

BIOLOGICAL SHIELD FOR A NUCLEAR REACTOR

BACKGROUND OF THE INVENTION

The invention relates to a biological shield for a nuclear reactor having a reactor pressure vessel of steel. The biological shield is made of concrete and surrounds the reactor pressure vessel. Cooling is provided at the shield for removing the heat which flows from the reactor pressure vessel into the concrete and also the heat which is generated in the concrete itself through gamma radiation thereby maintaining the strength of the concrete. Heretofore, the cooling was provided in the space between the shield and the pressure vessel. Because radiation density present at this location is considerable, the cooling medium, which could be air for example, would circulate in a separate, closed cooling circuit to prevent contamination of the reactor building through radioactivity such as argon activation caused by neutron radiation. Such closed systems however, require separate blowers and can be secured against failure only at considerable cost.

BRIEF SUMMARY OF THE INVENTION

Accordingly, it is an object of the invention to provide a biological shield for a nuclear reactor wherein the cooling thereof is simplified.

According to a feature of the invention, the biological shield includes two concentric shield parts. The inner shield part surrounds the reactor pressure vessel and conjointly defines with the outer shield part a gap through which a cooling medium circulates. There is thereby obtained within the shield a circulation of the coolant which is protected against neutron radiation by the inner shield part to such an extent that excessive activation can no longer occur. For this purpose, the wall thickness of the inner shield part should be at least 20 cm.

On the other hand, the wall thickness of the inner shield should be kept as small as possible in view of the cooling. In any event, the cooling from the side facing away from the reactor pressure vessel must be sufficient to hold the permissible temperature also on the side of the concrete which is facing the pressure vessel. It has been found that it is advantageous to make the inner shield part 60 to 70 cm thick.

With the invention, the coolant need not circulate through a closed circuit which requires separate blowers. Rather, the ambient air can be used as the coolant which is already provided for the reactor building and for which dangerous activation does not have to be considered. However, it is also conceivable that a gas different from air such as carbon dioxide ($CO_2$) or nitrogen ($N_2$) can be used in view of fire safety consideration.

While the thickness of the inner part of the shield is determined according to its shielding effectiveness which prevents activation of the coolant, the outer part of the shield can serve as the sole support of the components which are arranged in surrounding relation to the reactor pressure vessel. The inner shield part of the biological shield can then remain practically free of forces. However, it can advantageously carry thermal insulation directly on its inner surface. Heretofore, the thermal insulation was usually associated with the reactor pressure vessel proper or was installed in a self-supporting manner between the latter and the concrete of the shield. However, a space remains between the reactor pressure vessel and the thermal insulation which is available for in-service testing of the reactor pressure vessel for introducing probes. This interspace is closed off and it therefore is not in connnection with the circulating coolant of the shield. The interspace can, for instance, be filled with stationary air.

The inner shield part of the shield may contain coolant pipes which, in addition to providing cooling from the outside, permit a low temperture to be maintained, also in relatively thick-walled concrete sections. Such coolant pipes can advantageously surround the base portion of the reactor pressure vessel in U-fashion, so that the increased wall thickness in this region causes no undue temperature rise, the wall thickness being increased in consideration of the maximum credible accident for example. The cooling pipes, however, should be protected against the reactor pressure vessel by a layer of concrete at least 10 cm, but preferably 30 to 50 cm thick. The diameters of the coolant pipes can be stepped here corresponding to a uniform temperature distribution, so that the desired amount of heat is removed for a given coolant pressure. To coolant pipes supplied with air, a water drain line can be connected.

Relatively large cross-sections, for example 10 $m^2$, lead from the gap between the inner and outer shield parts to the outside. These cross-sections provide an advantageous pressure relief in case an accident occurs wherein the coolant escapes from the reactor pressure vessel or the main coolant lines connected thereto. In some cases, however, it may be advisable to provide structural components to ensure that the cross-section which leads to the reactor pit will reach only a limited size, so that the pressures in the reactor pit, which are generated if the coolant escapes, remain small; the reactor pit being the space which is enclosed by the biological shield that contains the reactor pressure vessel. For this purpose it is advisable to surround the main coolant lines emanating from the reactor pressure vessel in the region of the gap by a double pipe. The double pipe is preferably detachable, particularly in telescopic fashion. The double pipe is advantageously secured in the concrete of the outer shield part which surrounds the main coolant line, for example, by being set in a masonry conduit. Cooling gas can flow between the two pipes.

Although the invention is illustrated and described herein as a biological shield for a nuclear reactor, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

In the following Figures, similar or like components are designated by the same reference numeral in each Figure in which they appear.

DESCRIPTION OF THE PREFERRED EMBODIMENTS OF THE INVENTION

Figure 1:
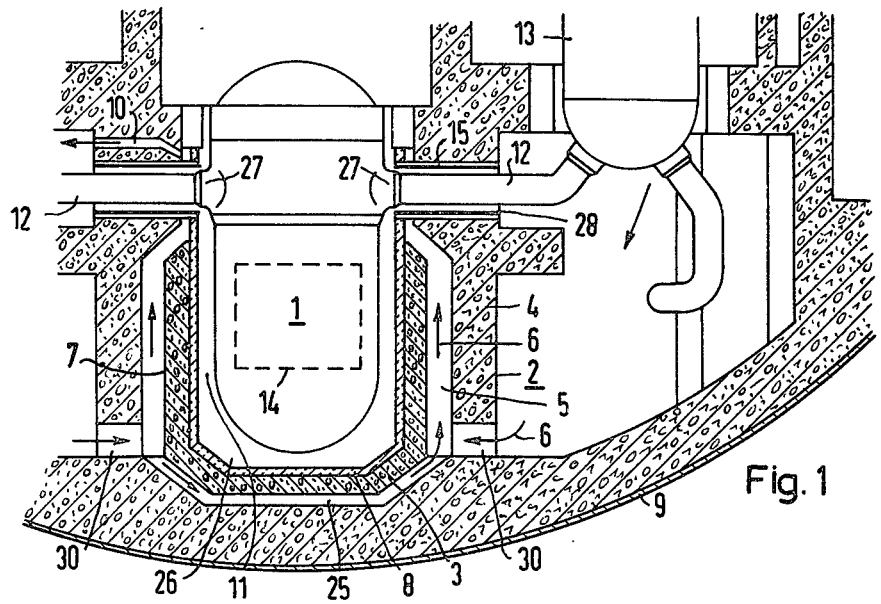
FIG. 1 is an elevation view, partially in section, of a nuclear reactor equipped with a biological shield according to the invention.

Referring to FIG. 1, a reactor pressure vessel 1 made of steel is surrounded by a biological shield 2 made of concrete. The shield 2 bounds the reactor pit 26 and provides shielding against the radiation emanating from the reactor pressure vessel 1, particularly, the neutron radiation. The biological shield 2 includes two concentric, essentially cylindrical shield parts 3 and 4, of which only the outer shield part 4 is joined with the concrete of the other parts of the reactor building within the steel containment shell 9 so that the outer shield part serves as a supporting structure. In contrast, the inner shield 3 is a separate part without supporting function. Between the two shield parts 3 and 4 there is a clear gap 5. If required the gap is interrupted at only a few places for accommodating vertical support ribs; these ribs form cooling ducts 25 underneath the reactor pressure vessel.

Cooling air is conducted through the gap 5 and the cooling ducts 25 as indicated by the arrows 6. The cooling air is part of the ambient air which circulates within the containment shell 9. The cooling air flows over the outer shield part 4 on both sides, but over the inner shield 3 only on its outside 7.

The wall thickness of the inner shield part 3 is 65 cm and is only approximately one-half the thickness of the wall of the supporting outer shield part 4. Because of the relatively small wall thickness of the inner shield part 3, the cooling from one side is, however, sufficient to prevent undue temperature increases, especially since the thermal loading is reduced by a thermal insulation 8 on the side of the inner shield 3 which faces the reactor pressure vessel 1. The thermal insulation 8 also separates the circulating cooling air indicated by the arrows 6 from stationary air in the space 11 of the reactor pit 26 between the inner shield part 3 and the reactor pressure vessel 1.

The coolant, which is shielded by the inner shield part 3 from the reactor core 14, cannot be activated to an extent that is dangerous and is therefore discharged directly into the reactor building through ducts 10. The cooling air can in addition escape through the annular gaps 28 along the main coolant lines 12 which are welded to the coolant stub 27 of the reactor pressure vessel 1 and lead to the steam generators 13 through the concrete of the outer shield part 4. The ducts 10, the annular gaps 28 and an inlet opening 30 also are available as outlet cross-sections in the event that an accident occurs and coolant escapes from the reactor pressure vessel 1 or from the main coolant lines 12. For limiting the leakage cross-section leading to the reactor pit 26, components 15 are provided. The components are shown in FIG. 1 and are double pipes in the region of the main coolant lines 12; these double pipes are tightly enclosed by the thermal insulation 8 and are placed on the coolant stubs 27.

Figure 2:
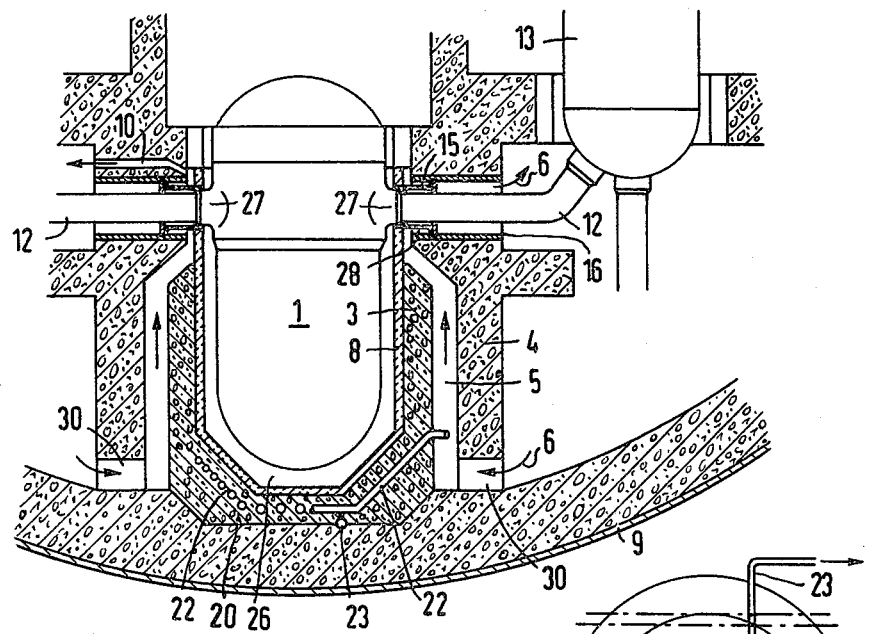
FIG. 2 is also an elevation view of a nuclear reactor equipped with a biological shield according to an alternate embodiment of the invention. The inner shield part is provided with a base portion of increased thickness.

In the embodiment of FIG. 2, the inner shield part 3 is made thicker in the lower region 20 to provide for a stable vessel which permits better lateral shielding, particularly in the region of the inlet openings 30. To nonetheless ensure the required cooling of the shield part 3, U-shaped cooling pipes 22 are embedded in the part 3 through which cooling air flows. The cooling pipes 22 are of different lengths. As shown on the left-hand side of FIG. 2, these pipes 22 can have cross-sections corresponding to stepped diameters so that with the same pressure difference always so much coolant is conducted through these pipes that the same final temperature is reached.

Figure 3:
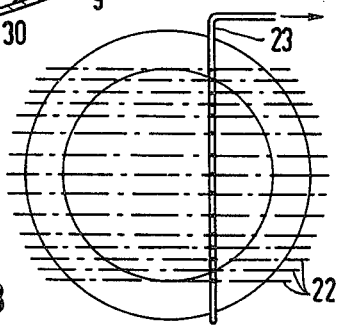
FIG. 3 is a plan view and shows schematically the cooling tubes disposed in the lower portion of the inner shield part of the biological shield illustrated in FIG. 2.

FIG. 3 shows in plan view that the cooling pipes 22, represented only by their longitudinal axes, are connected by a common water drain line 23 which extends transversally to the pipes 22. The drain line 23 is connected at the lowest point of the cooling pipes 22.

The double tube 15 which surrounds the main coolant line 12 is shown in greater detail in FIG. 2. The double tube 15 limits the cross-section that is available for the entrance of steam to the reactor pit 26. As indicated by the arrow 6, cooling air also flows between the double tube 15 and the masonry tube or between the masonry tube and the insulation (not shown) of the main coolant line 12. The tube 15 is retractable in telescope fashion for in-service testing on the main coolant lines 12 and is secured in a masonry tube 16 cemented into the shield part 4.

What is claimed is:

1. In a nuclear reactor equipped with a reactor pressure vessel made of steel and a concrete biological shield surrounding the reactor pressure vessel, said shield comprising an inner shield part surrounding the reactor pressure vessel and an outer shield part disposed around and concentric to said first shield part, said inner and outer shield parts conjointly defining a gap therebetween, cooling medium supply means communicating with said gap for circulating a cooling medium therethrough, said reactor pressure vessel and said inner part conjointly defining an intermediate space therebetween, means for closing off said intermediate space from said gap, said nuclear reactor including a containment shell enclosing said biological shield and said reactor pressure vessel, said cooling medium being air, and said cooling medium supply means comprising discharge means for conducting the air away from said gap and into the atmosphere of said containment shell, said inner shield part having a wall thickness of at least 20cm.

2. The biological shield of claim 1, said inner shield part having a wall thickness lying within the range of 60 to 70 cm.

3. The biological shield of claim 1 wherein ancillary components are provided in surrounding relation to the reactor pressure vessel, said outer shield part being configured as a supporting structure for supporting the ancillary components.

4. The biological shield of claim 1 comprising thermal insulation mounted on the inside of said inner shield part adjacent the reactor pressure vessel.

5. The biological shield of claim 1, said inner shield part containing a plurality of pipes for conducting a cooling medium therethrough.

6. The biological shield of claim 5 said pipes being U-shaped and being disposed in said inner shield part in surrounding relation to the base portion of the reactor pressure vessel, said inner shield part comprising a layer of concrete disposed between said pipes and the base of the reactor pressure vessel to shield said pipes.

7. The biological shield of claim 6, said layer having a thickness of at least 10 cm.

8. The biological shield of claim 7, said layer having a thickness lying within the range of 30 to 50 cm.

9. The biological shield of claim 6, said pipes having respective diameters selected so as to cause an even temperature distribution when conducting the cooling medium therethrough.

10. The biological shield of claim 9 wherein the said cooling medium conducted through said pipes is air, the biological shield comprising a drain line connected to each of said pipes.

11. The biological shield of claim 1, said inner shield part including a plurality of cooling channels for conducting a cooling medium therethrough.

12. The biological shield of claim 11 comprising a plurality of supporting ribs interrupting said gap between said inner shield part and said outer shield part to form said cooling channels.

13. The biological shield of claim 1, said inner shield part containing a plurality of pipes for conducting a cooling medium therethrough, and said inner shield part including a plurality of cooling channels for also conducting a cooling medium therethrough.

14. The biological shield of claim 13 said pipes being U-shaped and being disposed in said inner shield part in surrounding relation to the base portion of the reactor pressure vessel, said inner shield part comprising a layer of concrete disposed between said pipes and the base of the reactor pressure vessel to shield said pipes.

15. The biological shield of claim 14, said layer having a thickness of at least 10 cm.

16. The biological shield of claim 15, said layer having a thickness lying within the range of 30 to 50 cm.

17. The biological shield of claim 14, said pipes having respective diameters selected so as to cause an uneven temperature distribution when conducting the cooling medium therethrough.

18. The biological shield of claim 17 wherein the said cooling medium conducted through said pipes is air, the biological shield comprising a drain line connected to each of said pipes.

19. The biological shield of claim 1, said cooling medium supply means comprising discharge means for conducting the cooling medium away from said gap, said discharge means defining a cross-section through which the cooling medium passes away from said gap, and a component structure arranged at said cross-section for limiting the free space of said cross-section through which the cooling medium can pass away from said gap.

20. The biological shield of claim 19 wherein the nuclear reactor includes main coolant lines connected with the reactor pressure vessel, the coolant lines extending through said discharge means and passing the region of said gap between said inner and outer shield parts, said component structure being a double tube surrounding said main coolant lines at said region.

21. The biological shield of claim 20, said double tube being detachable and telescopically arranged.

22. The biological shield of claim 20, said outer shield part made of concrete having a passage for accommodating the main coolant lines, said double pipe being secured in the concrete of said outer shield defining said passage.

23. The biological shield of claim 22, said double pipe and said concrete wall of said passage conjointly defining a passage space through which the cooling medium can flow.

24. The biological shield of claim 20 comprising a masonry pipe cemented into said outer shield part for accommodating the passage of the main coolant lines through the outer shield part, said double pipe being held in said masonry pipe.

25. The biological shield of claim 24, said masonry pipe and said double pipe conjointly defining a passage space through which the cooling medium can flow.

* * * * *

UNITED STATES PATENT AND TRADEMARK OFFICE
CERTIFICATE OF CORRECTION

PATENT NO. : 3 928 133
DATED : December 23, 1975
INVENTOR(S) : Hans-Peter Schabert et al It is certified that error appears in the above-identified patent and that said Letters Patent are hereby corrected as shown below:

In the Foreign Application Priority Data change the date from "May 26, 1972" to read --April 26, 1972--

Signed and Sealed this twenty-third Day of March 1976

[SEAL]

Attest:

RUTH C. MASON
*Attesting Officer*

C. MARSHALL DANN
*Commissioner of Patents and Trademarks*